United States Patent [19]

Culkin

[11] Patent Number: 4,693,802

[45] Date of Patent: Sep. 15, 1987

[54] ELECTRICALLY AUGMENTED VACUUM FILTRATION APPARATUS FOR PRODUCING A DIALYZED CAKE PRODUCT

[75] Inventor: Joseph B. Culkin, North Stamford, Conn.

[73] Assignee: Dorr-Oliver Incorporated, Stamford, Conn.

[21] Appl. No.: 725,188

[22] Filed: Apr. 19, 1985

[51] Int. Cl.$^4$ .............................................. B01D 13/02
[52] U.S. Cl. ............................... 204/182.4; 204/151; 204/301
[58] Field of Search .................. 204/151, 182.2–182.4, 204/301

[56] References Cited

U.S. PATENT DOCUMENTS

| | | | |
|---|---|---|---|
| 4,132,626 | 1/1979 | Kunkle | 204/301 |
| 4,168,222 | 9/1979 | Freeman | 204/182.2 |
| 4,207,158 | 6/1980 | Freeman | 204/182.2 |
| 4,312,729 | 1/1982 | Wills | 204/299 R |
| 4,331,525 | 5/1982 | Huba et al. | 204/300 EE |

Primary Examiner—Terryence Chapman

[57] ABSTRACT

An electrically augmented vacuum filtration apparatus for dewatering a suspension of solids wherein the transport of ions into the cake product is controlled by provision of a suitable anionic solid polymeric electrolyte arranged to isolate at least one electrode from the suspension of solids.

7 Claims, 3 Drawing Figures

ELECTRICALLY AUGMENTED VACUUM FILTRATION APPARATUS FOR PRODUCING A DIALYZED CAKE PRODUCT

BACKGROUND OF THE INVENTION

1. Field of the Invention

The present invention is directed to an improved electrofilter apparatus for accomplishing electrically augmented vacuum filtration to produce a dialyzed cake product.

2. Related Art

Electrically augmented vacuum processes and apparatus for carrying out dewatering of suspensions are disclosed in U.S. Pat. No. 4,107,026, issued Aug. 15, 1978, U.S. Pat. No. 4,170,529, issued Oct. 9, 1979, U.S. Pat. No. 4,207,158, issued June 10, 1980, U.S. Pat. No. 4,303,492, issued Dec. 1, 1981, copending and still pending application, U.S. Ser. No. 222,057, filed Jan. 2, 1981, U.S. Pat. No. 4,312,729, issued Jan. 26, 1982 and U.S. Pat. No. 4,419,209, issued Dec. 6, 1983. The entire disclosures of these patents and applications are incorporated herein by reference thereto.

In these earlier disclosures, self-contained hollow electrode assemblies are provided which are normally submerged in the suspension, but allow bodily removal therefrom for inspection or other purposes. These hollow electrode assemblies comprise two types of wall surfaces: ion-pervious walls for electrode assemblies of one polarity and liquid-pervious walls for electrode assemblies of the opposite polarity.

In operation, with electrode assemblies of both types immersed in the suspension, a source of vacuum is connected to the interior of the electrode assemblies having liquid-pervious walls to provide a controllable pressure differential, thereby producing a flow of carrier liquid through the filtration surface, while the solids migrate in the opposite direction, under the influence of the electric field, to deposit as cake upon the electrode assemblies having ion-pervious walls. Filtrate or permeate liquid, that is, carrier liquid freed of solids, is withdrawn or pumped from the interior of the liquid-filled hollow electrode structure at a controllable rate.

As indicated, cake deposition occurs on the hollow electrode assemblies having ion-pervious surfaces; these electrode assemblies are filled with an electrolyte and have an electrode element therein immersed in the electrolyte. These electrode elements are thus isolated from direct contact with the suspension. The electrolyte is specially selected for high conductivity and compatability with the electrode element. Since decomposition or evolution products and heat are generated at the electrode element within the hollow ion-pervious assembly, provision is made for a flow of electrolyte into and through the electrode chamber so that foreign products, including gases, and heat are swept out of the chamber and a relatively constant predetermined electrolyte composition is maintained.

Initially, the surface member employed at the anode was a filter cloth, such as a woven fabric made from Dynel (a copolymer of vinyl chloride and acylonitrile). The cake obtained with this arrangement was suitable for some commercial purposes, but was found to be ionically contaminated to an undesirable degree and to exhibit a high conductivity, which is disadvantageous. The contamination was found to be due in large measure to electroosmotic pumping of anolyte through the filter cloth into the cake. The remedy for this found in the prior art, was to substitute a hydraulically impermeable solid polymeric electrolyte or ion exchange membrane for the filter cloth at the anode. A cationic member was employed and this essentially eliminated contamination due to electroosmotic pumping. However, it was found that ionic contamination persisted, albeit at a lower level. It has now been determined that this lower level (but still undesirable) contamination is due to inherent characteristics of the cationic membrane at the anode.

There is a substantial advantage to be secured if this remaining contamination can be eliminated or greatly reduced in the electrically augmented vacuum filtration process. It is believed that the following description provides a solution to this contamination problem.

SUMMARY OF INVENTION

An electrically augmented vacuum filtration apparatus for dewatering a suspension of solids comprises an enclosure for accommodating a bath of solids in suspension. The enclosure has an inlet to admit the suspension of solids and a pair of electrode assemblies in contact with the suspension and connected to an electrical circuit for establishing an electrical potential between the electrode assemblies. An essentially hydraulically impermeable solid polymeric electrolyte or ion exchange resin membrane is provided on the first electrode assembly to isolate the electrode element thereof from the bath. The solid polymeric electrolyte has a highly preferred transport capability for ions of a charge opposite to that of said electrode element (the charge transfer number $t+$ is in the range of 0 to 0.3 where the suspended solid particles have a negative charge). An electrolyte is provided in the space between the electrode element and the solid polymeric electrolyte and means is provided for circulating electrolyte through that space. The second of the electrode assemblies has a second electrode element and means for separating and withdrawing a filtrate from the suspension of solids. The first electrode assembly is adapted to receive a cake of solids. Means is provided for removing the cake deposit from the first electrode assembly and for recovering the cake for use or further processing.

The second electrode assembly is an arrangement entirely similar to the cathode structure shown in U.S. Pat. No. 4,168,222; i.e., a construction designed to allow carrier liquid from the suspension to be drawn through a filter medium (liquid permeable electrode walls) and thence to be drawn or pumped out to disposal.

DETAILED DESCRIPTION

Figure 1:
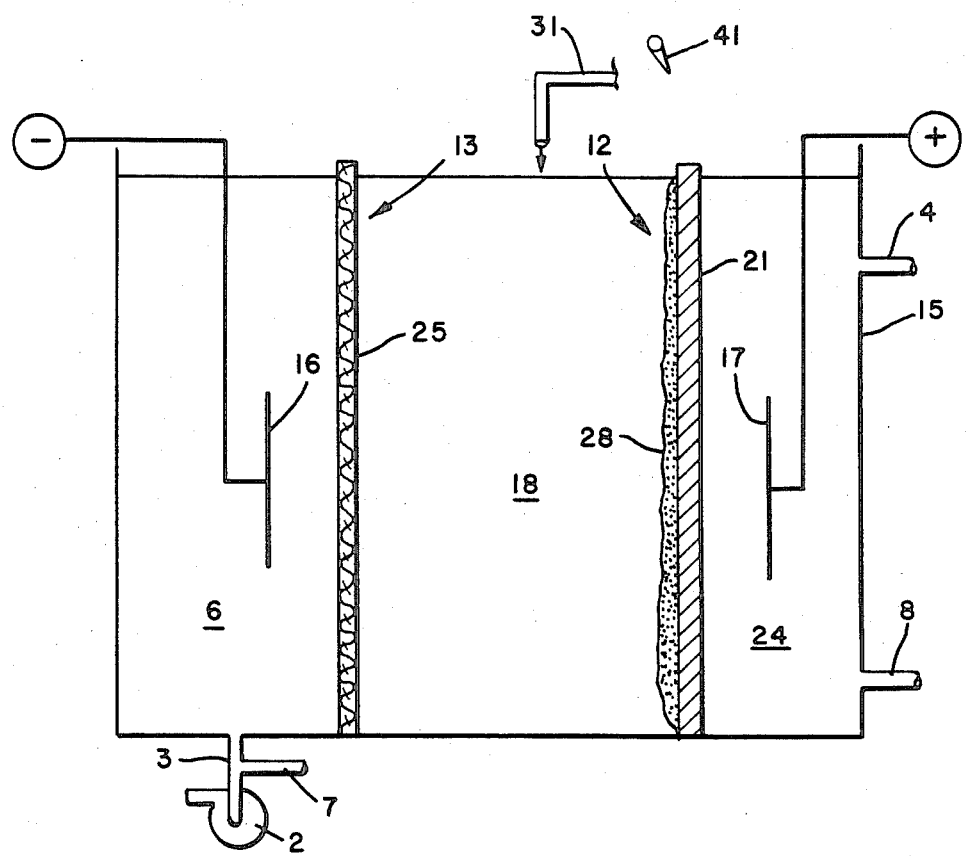
FIG. 1 is a schematic view of an embodiment of the electrically augmented vacuum filtration apparatus of the invention.

The embodiment of the invention as illustrated in FIG. 1 consists of a tank 15 having a slurry inlet 31 and containing a pair of electrode assemblies 12 and 13. A bath of suspended solids 18 is present between the two electrode assemblies. Cathodic electrode assembly 13 comprises a cathode 16 and a filter cloth divider 25 which isolates cathode 16 from the bath 18 and provides a filtrate chamber 6 in which the cathode 16 is situated. The other electrode assembly 12 comprises an anode 17 and an anionic solid polymeric electrolyte 21 (an anionic membrane such as Ionac ion exchange membrane which is a polystyrene having quaternary ammonia groups affixed thereto on a polyolefin cloth reinforcement). The solid electrolyte structure provides a surface capable of receiving a cake deposit 28 and forms a divider between an anolyte chamber 24 in which the electrode 17 is positioned and the bath 18. A doctor blade 41 is provided for removing the cake 28 from the surface of the solid electrolyte. Vacuum is applied to filtrate chamber 6 to draw carrier liquid from the bath 18 through the filter cloth 25. The large volume of filtrate moving through filter cloth 25 at the cathode 16 is removed through conduit 3 and pump 2. Anolyte is circulated through chamber 24, entering by conduit 8 and exiting through conduit 4.

In operation, a feed slurry is introduced into bath compartment 18 of tank 15 through inlet 31. The electrolyte (anolyte) circulation system is initiated and electrolyte circulates through the anolyte chamber 24 entering at conduit 8 and exiting at conduit 4. The electrical power source is actuated, establishing an electrical potential across bath 18. Vacuum is applied through conduit 7 to filtrate chamber 26 so that carrier liquid from bath 18 flows through the filter medium or filter cloth 25 into the filtrate chamber 6. Filtrate is withdrawn from filtrate chamber 6 by pump 2 through conduit 3 for disposal.

At the same time, solids in bath 18 (clay particles, for example) move toward anode assembly 12 and deposit as a cake 28 on the anionic solid polymer electrolyte 21. A doctor blade 41 is provided for harvesting deposited cake as required.

The product cake is found to have a low conductivity.

Figure 3:
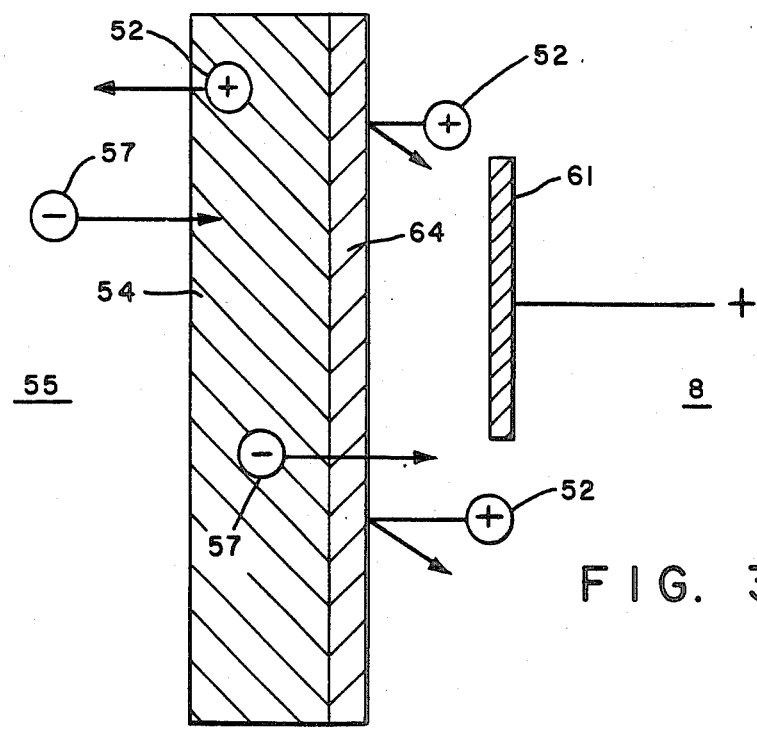
FIG. 3 is a diagram of phenomena occurring at the anode in an apparatus constructed in accordance with the present invention.
Figure 2:
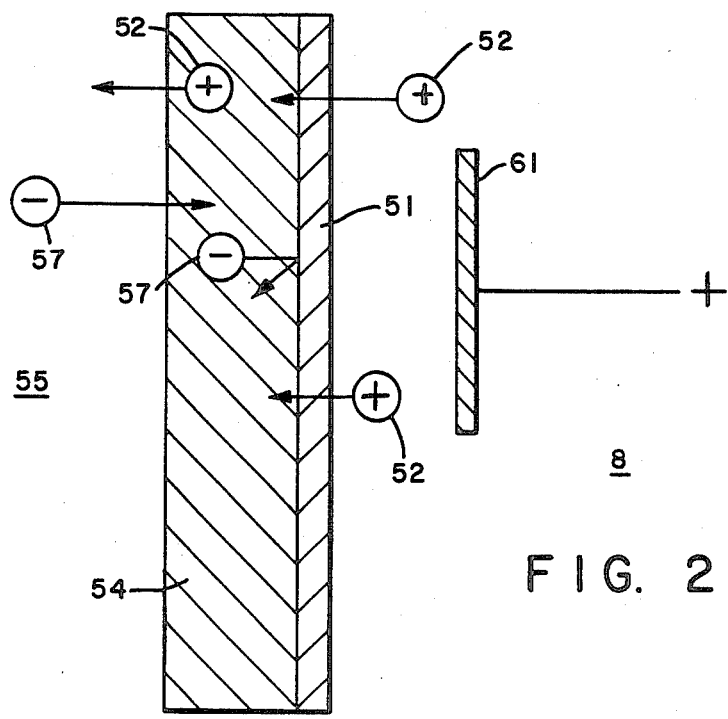
FIG. 2 is a diagram of phenomena occurring at the anode in prior art electrically augmented vacuum filtration apparatus.

Without committing to a particular explanation of the results observed, the present understanding of the phenomenon involved is illustrated in FIGS. 2 and 3.

FIG. 2 is directed to the situation at the anode where, as in the prior art, a cationic ion exchange membrane 51 separates the anolyte chamber 8 from the bath 55. Cake 54 has been deposited on the membrane 51. As shown, cations 52 in the anolyte, having a positive charge, migrate through membrane 51 into the cake 54. Anions 57 having a negative charge, migrate toward the anode 61 from both 55 passing into the cake 54 with further progress toward the anode 61 barred by the cationic membrane 51. The net result is a build-up of ions in the cake. Typical of the cations involved are $Na^+$, $K^+$; typical anions are $SO_4^{--}$, $Cl^-$. Turning now to the situation of the present invention as illustrated in FIG. 3; that is, an ionic solid polymer electrolyte 64 separating the anolyte chamber 8 from the bath 55. It will be noted that cations 52 in the anolyte are barred from passing through the solid electrolyte 61 into the cake 54 and so remain in the anolyte. Cations 52 in the cake 54 tend to migrate out of the cake 54 toward the cathode, while anions 57 in the cake 54 migrate freely through the membrane 64 toward the anode 61. The net effect, then, is to deplete the cake of ions.

The depletion of ions in the cake is thus clearly due to a dialysis effect. Strictly applied, dialysis refers to the selective transport of ions by an applied field. When a cation exchange membrane is used in front of the anode, dialysis occurs to deplete the anolyte of ions and enrich the cake in ions. When an anion exchange membrane is used, dialysis occurs to deplete the cake in ions and enrich the anolyte in ions.

Solid polymeric electrolytes, for example, ion exchange resins, are characterized by charge transfer numbers $t+$ or $t-$. The charge transfer number $t+$ is the fraction between 0 and 1 of the total current carried by cations. The fraction carried by anions is $t-$. By charge neutrality $t+ + t- = 1$. In the present invention the member chosen for positioning before the anode is substantially anion selective; i.e., $t+$ is in the range 0 to 0.3.

Although the present invention has been described in conjunction with preferred embodiments, it is to be understood that modification and variation may be resorted to without departing from the spirit and scope of the invention, as those skilled in the art will readily understand.

I claim:

1. In a system for dewatering a suspension of particulate solids such as kaolin clay using a known electrically augmented vacuum filter apparatus comprising a tank adapted to receive a suspension to be filtered, and anodic and cathodic electrode assemblies adapted to be positioned in said tank in a manner such as to be submerged in suspension in said tank, said anodic electrode assembly being adapted for deposition thereon of filter cake and including an anode element and means for supplying anolyte into and out of said anode assembly, said cathodic electrode structure including a cathodic element associated with a filter medium adapted for the passage therethrough of filtrate, the improvement which comprises employing a solid polymeric electrolyte on said anodic assembly which is substantially anion selective so that anions in said cake migrate relatively freely through said solid electrolyte into said anolyte while cations migrate from said cake toward said cathode thereby producing a cake which is substantially ion depleted.

2. The system of claim 1 wherein the solid polymeric electrolyte has a charge transfer number (t+) in the range from 0 to 0.3.

3. The system of claim 1 wherein the solid polymeric electrolyte is a polystyrene having quaternary ammonia groups afixed thereto.

4. In a process for substantially depleting ions from a cake of solids from suspension deposited on an anode assembly, the improvement comprising using the system of claim 1.

5. An electrically augmented vacuum filtration apparatus for dewatering a suspension of solids comprising an enclosure for accommodating a bath of solids in suspension, said enclosure having inlet and outlet means, a pair of spaced electrode assemblies in contact with said suspension and connected to an electrical circuit for establishing an electrical potential between said electrode assemblies, the first of said electrode assemblies having an electrode element isolated from said bath by an essentially hydraulically impermeable solid polymeric electrolyte spaced from said electrode element, said solid polymeric electrolyte having a highly preferred transport capability for ions of a charge opposite to that of said electrode element, an electrolyte in the intervening space between said electrode element and said solid polymeric electrolyte, means for circulating electrolyte through said intervening space, the second of said electrode assemblies comprising at least a second electrode member and having means associated therewith for separating and withdrawing a filtrate from said suspension of solids, said first electrode assembly being adapted to receive a cake of deposited solids, means for removing said cake deposit from said first electrode assembly and recovering said cake for use or further processing.

6. The electrically augmented vacuum filtration apparatus of claim 4 wherein the charge transfer number which characterizes said solid polymeric electrolyte is in the range from 0 to 0.3.

7. In a process for substantially depleting ions from a cake of solids from suspension deposited on an electrode assembly, the improvement comprising using the apparatus of claim 5.

* * * * *